United States Patent

[11] 3,568,839

| [72] | Inventor | John V. Dunlea, Jr. |
| | | Wellesley, Mass. |
| [21] | Appl. No. | 799,413 |
| [22] | Filed | Feb. 14, 1969 |
| [45] | Patented | Mar. 9, 1971 |
| [73] | Assignee | Seadun, Inc. |

[54] APPARATUS FOR SEPARATING AND REMOVING FLOATABLES
4 Claims, 3 Drawing Figs.

[52] U.S. Cl.............................................. 210/152,
210/194, 210/206, 210/525, 210/526
[51] Int. Cl......................................................... B01d 21/12
[50] Field of Search........................................ 210/70, 73,
83, 84, 173, 195, 197, 206, 251, 523—526,
538—540, 152, 194

[56] References Cited
UNITED STATES PATENTS

| 876,713 | 1/1908 | Harden | 210/523X |
| 1,981,310 | 11/1934 | Currie | 210/540 |
| 2,199,788 | 5/1940 | Durdin, Jr. | 210/173X |
| 2,654,479 | 10/1953 | Driessen | 210/526X |
| 2,713,026 | 7/1955 | Kelly et al. | 210/525X |
| 2,920,763 | 1/1960 | Lind et al. | 210/525X |
| 3,121,680 | 2/1964 | Ciabattari | 210/70X |
| 3,447,683 | 6/1969 | Luce, Jr. | 210/540X |
| 3,480,543 | 11/1969 | Hildebrand | 210/206X |

*Primary Examiner*—John Adee
*Attorney*—Chittick, Pfund, Birch, Samuels & Gauthier ABSTRACT: Apparatus for removing floatable matter (commonly referred to as "floatables") from rubbish prior to the subsequent treatment thereof. The rubbish is deposited in a water-filled tank and the water is agitated to break up and thoroughly wet all particles. The floatables are swept over a spillway onto a first conveyor exterior of the tank, which conveyor removes the floatables to another location for further processing. A second conveyor removes that portion of the rubbish which sinks to the bottom of the tank.

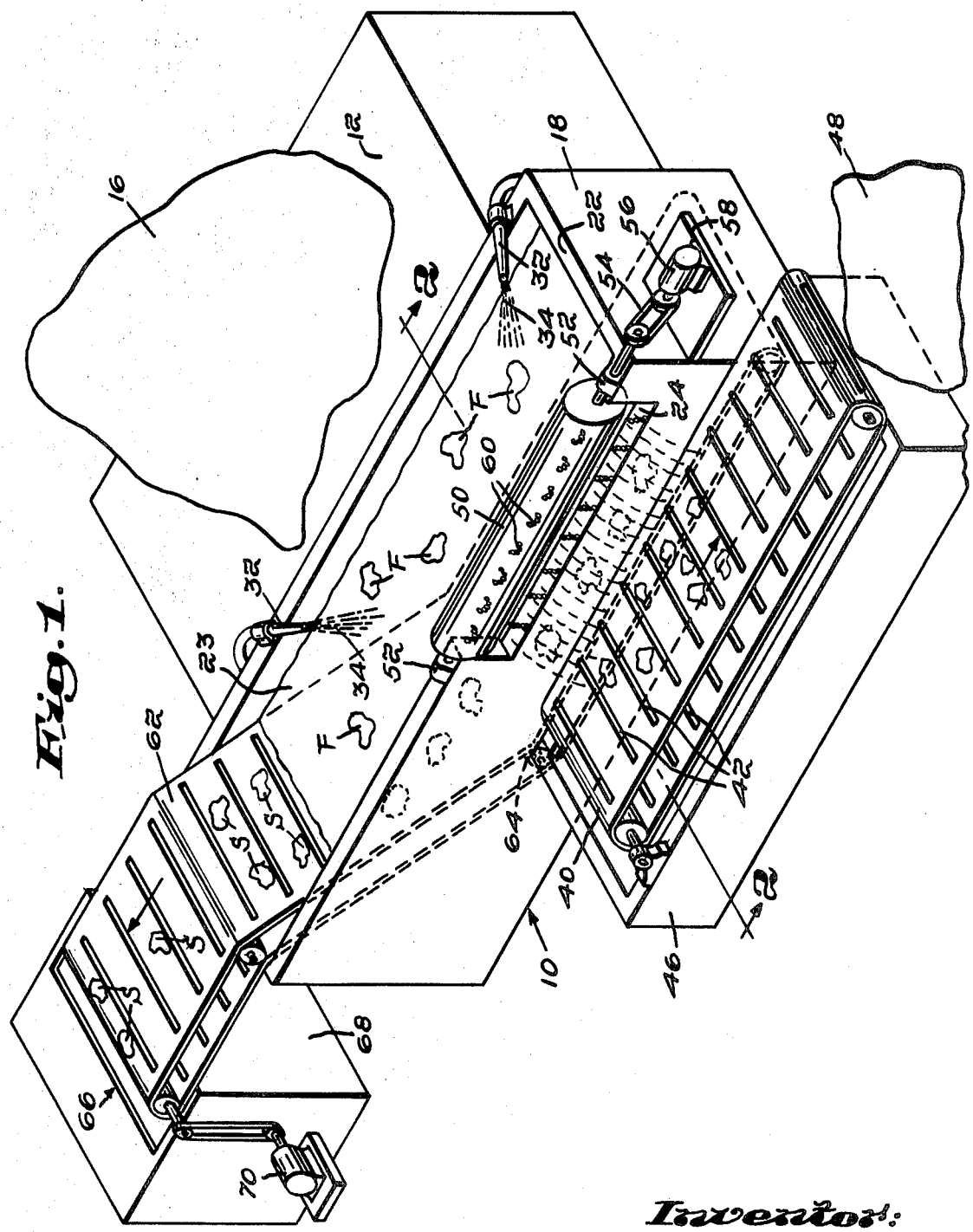

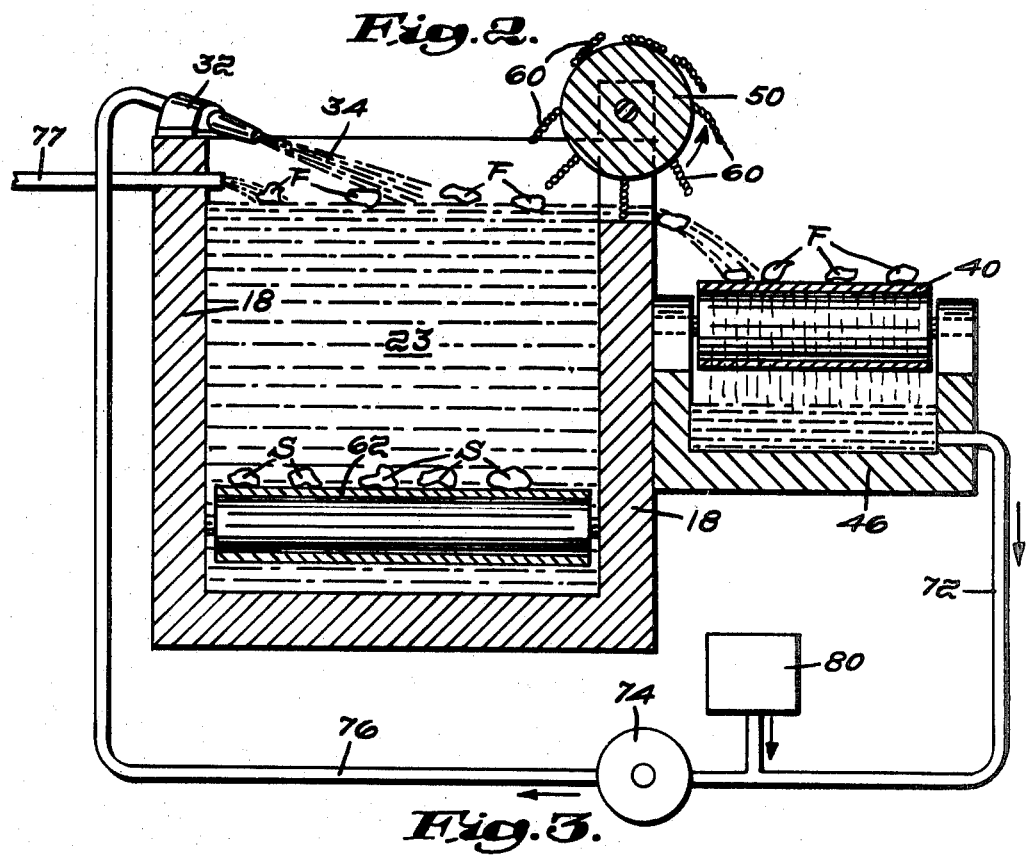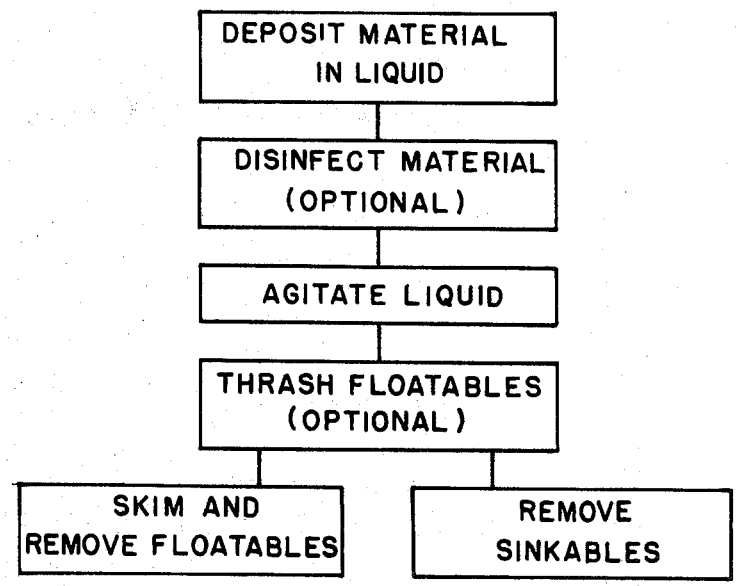

APPARATUS FOR SEPARATING AND REMOVING FLOATABLES

BACKGROUND OF THE INVENTION

This invention relates generally to apparatus for bulk rubbish disposal, and is particularly concerned with the separation and removal of floatables from rubbish prior to the subsequent treatment thereof.

Governmental authorities on national, state and local levels are becoming increasingly concerned with the problem of bulk rubbish disposal. My previous U.S. Pat. No. 3,390,088 offers a solution to this problem by providing an improved method for the disposal of rubbish at sea. The present invention relates to the aforementioned method in that it may if desired be employed in conjunction therewith. More particularly, experience has indicated that about 5—10 percent of raw rubbish comprises floatables such as for example polystyrene foams, plastics, glass bottles, etc. which do not readily submerge in water. In order to facilitate the task of compacting rubbish into high-density bundles and thereafter submerging the bundles at sea, this invention provides for the separation an removal of such floatable material at an early stage in the treatment process. Moreover, in certain instances, it may be desirable to render the rubbish biostatic, thereby minimizing odors and health hazards which normally plague conventional rubbish removal operations. To this end, the present invention also provides means for treating the rubbish with a suitable disinfectant at the same time that the floatables are being removed. After having been treated in accordance with the present invention, the rubbish may be further processed for disposal at sea or in the alternative, the rubbish may be employed for other uses such as for example, land fill.

SUMMARY OF THE INVENTION.

In accordance with the present invention, rubbish is deposited in a water-filled separation tank. The water is agitated, as for example by high-pressure water jets, to break up and thoroughly wet the rubbish. Means may also be provided to mechanically thrash or grind the rubbish to break up bottles and other like hollow material. The floatables that remain on the surface of the water are forced by the water jets over a spillway onto an adjacent conveyor for removal. The remainder of the rubbish (called "sinkables") settles to the bottom of the tank where it may be removed by a variety of conventional means, such as for example by a conveyor running along the tank bottom. The water is preferably recycled and a suitable disinfectant added thereto to render the rubbish biostatic.

It is accordingly a general object of the present invention to provide an improved apparatus for separating and removing the floatables from raw rubbish prior to subsequent treatment or use thereof.

A more specific object of the present invention is to provide a liquid separating means for removing floatables from rubbish, which means is capable of continuous efficient low-cost operation.

A further object of the present invention is to provide means for rendering raw rubbish biostatic while simultaneously removing floatables therefrom.

These and other objects and advantages of the present invention will become more apparent as the description proceeds with the aid of the accompanying drawings, wherein:

FIG. 1 is a perspective view of an apparatus embodying the concepts of the present invention; circulating FIG. 2 is a sectional view taken along line 2–2 of FIG. 1 with the means for circulting liquid through the apparatus shown schematically; and FIG. 3 is a block diagram schematically depicting the process steps.

Referring initially to FIG. 1, a treatment station generally indicated by reference numeral 10 is shown comprising an apron 12 upon which collection trucks may be driven to deposit rubbish into a large pile 16. The rubbish in pile 16 is then fed into an adjacent separating tank 18 by any conventional means.

The separating tank 18 is preferably elongated and rectangular, with its upper edge 22 cut away as at 24 to provide a spillway for the liquid 23 contained therein. The spillway controls the level of the liquid contained in the tank.

Either fresh water or sea water may be used to fill the tank as convenience dictates. If the invention is to be used in conjunction with a subsequent process which entails compaction of the rubbish for disposal at sea, the tank would normally be filled with sea water.

As the rubbish is pushed into the tank from pile 16, the sinkable matter S will descend to the bottom of the tank while the floatable matter F remains on the surface of the liquid. Preferably, means are provided for promoting the separation of the sinkables from the floatables. To this end, several high-pressure water nozzles 32 are mounted on the tank edge 22. The nozzles serve two purposes; first, the high-pressure water jets 34 issuing therefrom serve as a means of breaking up the rubbish being deposited in the tank. This is accomplished by direct impingement of the water jets on the rubbish, and also by the resulting turbulence produced on the surface of the water in the tank. The second purpose relates to a continuous "skimming" action which is produced by directing the water jets towards the spillway 24, thereby pushing any floatables in that direction. The floatables are thus continuously directed over the spillway 24 onto an endless conveyor 40 exterior of the tank 18. Conveyor 40 is slotted as at 42 to enable any water flowing from the tank along with the floatables to drop into an underlying flume 46.

In view of the foregoing, it should now be evident that although not illustrated herein, other means may also be employed to agitate and skin the floatables from the surface of the liquid in the tank. For example, air jets, possibly exiting from a submerged location in the tank, might be employed to create turbulence. Also, mechanical devices such as paddle arms traversing the surface of the water might be employed to skim the floatables and push them towards spillway 24.

Once on conveyor 40, the floatables are carried to a remote location as at 48 for further handling and/or processing. The floatables might be shredded and/or compacted and thereafter employed as land fill. As an alternative, the floatables might also be incinerated.

At this point, it should be noted that a relatively high percentage of the floatables may include hollow breakable objects, such as for example glass bottles, which is broken or ruptured, would quickly sink to the bottom of the separating tank. Accordingly, I have found it desirable to provide some means for mechanically beating or thrashing the floatables prior to their exiting from the tank over spillway 24. To this end, I have mounted a rotatable thrashing drum 50 at the spillway 24. Drum 50 is journaled between bearings 52, and is driven in a conventional manner in the direction indicated by means of a belt 54 and motor 56, the latter being mounted exterior of the tank 18 on a platform 58. Drum 50 is provided at spaced points on its exterior cylindrical surface with a plurality of chains 60 or like heavy flexible flailing elements. As the drum rotates, the chains beat the flotables exiting over spillway 24, thus breaking up the more fragile hollow objects which would otherwise resist sinking. This reduces the amount of floatables being removed from the tank and thus materially increases the efficiency of the operation.

The sinkable portion of the rubbish deposited in tank 18 drops onto another endless conveyor 62, the receiving end of which runs along the bottom of tank 18. Beginning at 64, conveyor 62 slopes upwardly out of the tank and thereafter runs horizontally to a delivery point 66 overlying the next piece of processing equipment 68, which may for example be a compactor or shreader. The conveyor 62 may be operated automatically by means of a motor 70 in either a continuous or intermittent manner, depending on the amount of sinkables being handled and the requirements of the subsequent processing apparatus.

The means employed to circulate fluid through the apparatus will now be described with particular reference to FIG. 2.

As previously mentioned, the water exiting from tank 18 over spillway 24 passes downwardly through slots 42 in the conveyor 40 into an underlying flume 46. From here, the water is drained through piping 72 to pump 74 and pumped through piping 76 to the nozzles 32. A disinfectant is added to the water from a disinfectant reservoir 80 to render all of the rubbish deposited in the tank 18 biostatic or even germ free. Makeup water can be added to the tank through pipe 77.

The particular disinfectant added can be selected from the many presently known in the art, such as chlorine gas and salts like calcium hypochlorite which are conventionally used in sewage systems, solubilized synthetic phenols such as o-phenyl phenol or p-tertiary-amylphenol, or quaternary ammonium compounds. The amount of disinfectant added should be enough to at least render the pathological viruses and bacteria in the rubbish inactive and, preferably should act as a germicide, so that the rubbish will not subsequently give off objectionable odors or germs which would contribute to air and water pollution.

Referring now to FIG. 3, the process of the present invention is illustrated diagrammatically in block form. A mass of nonintegral matter is deposited in a body of liquid of desired density and the liquid is agitated to separate the various elements of the mass. The elements floating on the surface of the liquid may be thrashed, if desired, to break them up and the floatables are then skimmed from the surface of the liquid. The elements sinking to the bottom of the tank are removed therefrom by conveyor 62. The liquid body and the rubbish being deposited therein may be disinfected by continuously injecting a disinfectant to the liquid being pumped through nozzles 32.

To summarize, a major advantage of this invention lies in the fact that it can be continuously operated by depositing rubbish in the tank 18 and continuously driving the conveyors 40 and 62 to remove the separated elements from the tank. The nozzles 32 are continuously supplied with water containing a disinfectant, thereby continuously skimming the floatables and disinfecting the rubbish. Thus the apparatus can be operated at a speed required to process a large volume of rubbish with relatively low labor requirements.

A further advantage of this invention is that it economically separates floatable from sinkable rubbish so that the floatables can if desired be processed separately before they are ultimately disposed of without necessitating the same processing for the greater bulk of sinkables. An associated advantage is that the water-saturated sinkables have an increased density and decreased strength which in turn facilitates subsequent compaction.

It is my intention to cover all changes and modifications of the embodiment herein disclosed which do not depart from the spirit and scope of the invention encompassed by the claims appended hereto.

I claim:

1. Apparatus for processsing solid refuse material, for example rubbish, which material consists of a nonintegral mixture of components which float on a liquid ("floatables") and components which sink in the same liquid ("sinkables"), said apparatus comprising: a tank containing a body of said liquid; means for depositing refuse material onto the surface of said liquid, whereupon the sinkables sink towards the bottom of said tank and the flotables remain afloat on the surface of said liquid; a spillway on one side of said tank over which both liquid an floatables are allowed to exit continuously from said tank during operation of the apparatus; receiver means exterior of said tank for receiving the liquid and floatables exiting over said spillway, said receiver means including first conveyor means for transporting the floatables to a suitable location for disposal; means for drawing liquid from said receiver means and for returning the same to said tank in the form of high-pressure liquid streams impinging directly onto the surface of said body of liquid and the refuse material deposited thereon, the direction and number of said streams being such as to promote breaking up and separation of the sinkables from the floatables while at the same time urging the floatables towards said spillway; a second conveyor means having one end located in said tank for receiving the sinkables descending through said body of liquid, said second conveyor means being operative to remove said sinkables from said tank; and, means for adding makeup liquid to said tank.

2. The apparatus as claimed in claim 1 further characterized by means for subjecting floatables approaching said spillway to a mechanical bearing action for the purpose of further breaking up and rupturing said floatables.

3. The apparatus as claimed in claim 2 wherein said means for subjecting floatables to a mechanical flailing action is comprised of a cylindrical drum parallel to and rotatably supported above said spillway, the said drum having a plurality of flexible flailing elements attached thereto; and means for rotating said drum.

4. The apparatus as claimed in claim 1 further characterized by means for adding a suitable disinfectant to the liquid being returned from said receiver means to said tank